United States Patent [19]
Cugini, Sr. et al.
[11] 4,295,275
[45] Oct. 20, 1981

[54] METHOD AND APPARATUS FOR MAKING RAISED AND FLAT LETTER SIGNS

[76] Inventors: Larry Cugini, Sr.; John J. Cugini, both of 23 Holley St. Extension, Danbury, Conn. 06810

[21] Appl. No.: 147,919

[22] Filed: May 8, 1980

Related U.S. Application Data

[62] Division of Ser. No. 23,599, Mar. 26, 1979, Pat. No. 4,230,513.

[51] Int. Cl.³ .......................... B43L 5/00; G01B 3/14; G09F 7/04

[52] U.S. Cl. .................................... 33/1 G; 33/1 AA; 40/621

[58] Field of Search .................. 33/1 AA, 1 G, 184.6, 33/137 R, 493; 35/26, 27, 66; 150/539, 299, 230, 574; 40/621, 595

[56] References Cited

U.S. PATENT DOCUMENTS

| | | | |
|---|---|---|---|
| 3,093,919 | 6/1963 | Holz | 33/137 R |
| 3,226,838 | 1/1966 | Courrege et al. | 40/621 |
| 3,357,107 | 12/1967 | Flower | 33/184.5 |
| 3,514,873 | 6/1970 | Stobbe | 40/621 |

*Primary Examiner*—David A. Simmons
*Assistant Examiner*—Louis Falasco
*Attorney, Agent, or Firm*—Mattern, Ware, Davis & Stoltz

[57] ABSTRACT

A signmaker's jig assembly incorporates a signblank-supporting worktable, a setting bar movable over the signblank for guiding the alignment of a line of letters to be installed on the signblank, a letter staging zone incorporating a letter aligning staging bar, a centering guide, and a manually movable adhesive transfer bar co-acting with the staging bar for seizing the staged line of letters en bloc, transferring them to the signblank, and installing them thereon. Different embodiments incorporate different features facilitating stripping each line of letters from the staging zone.

1 Claim, 17 Drawing Figures

FIG. 1
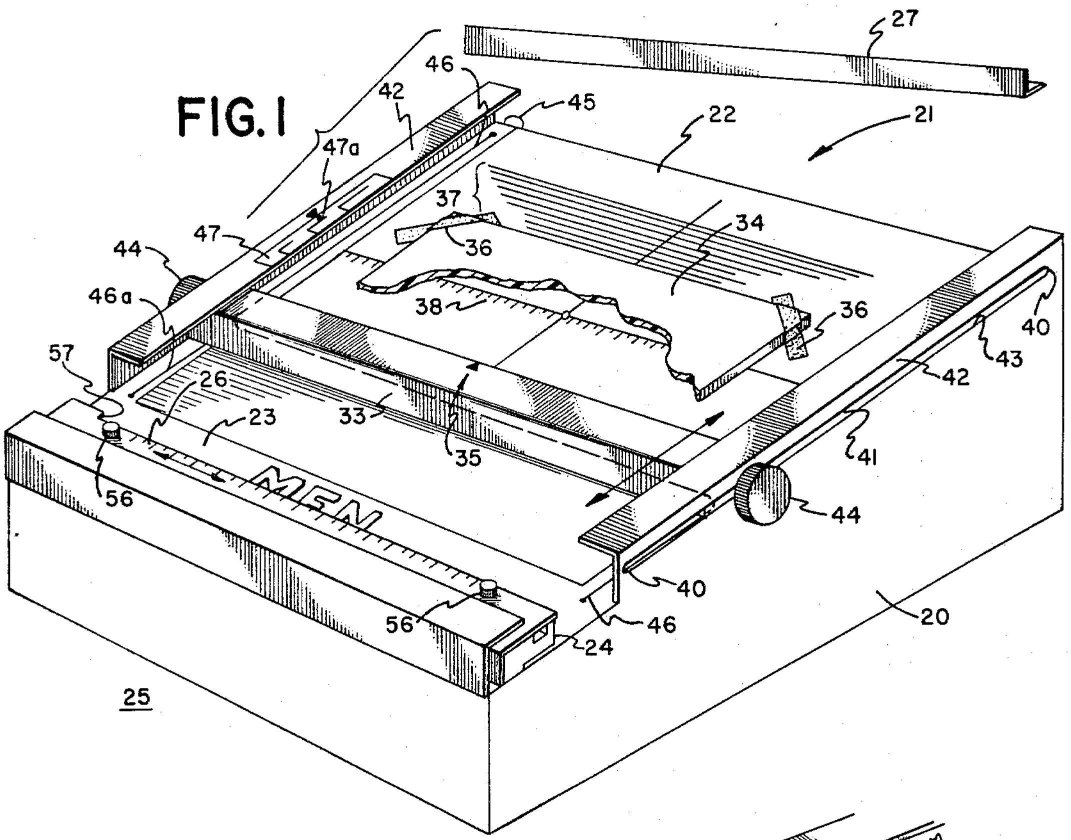
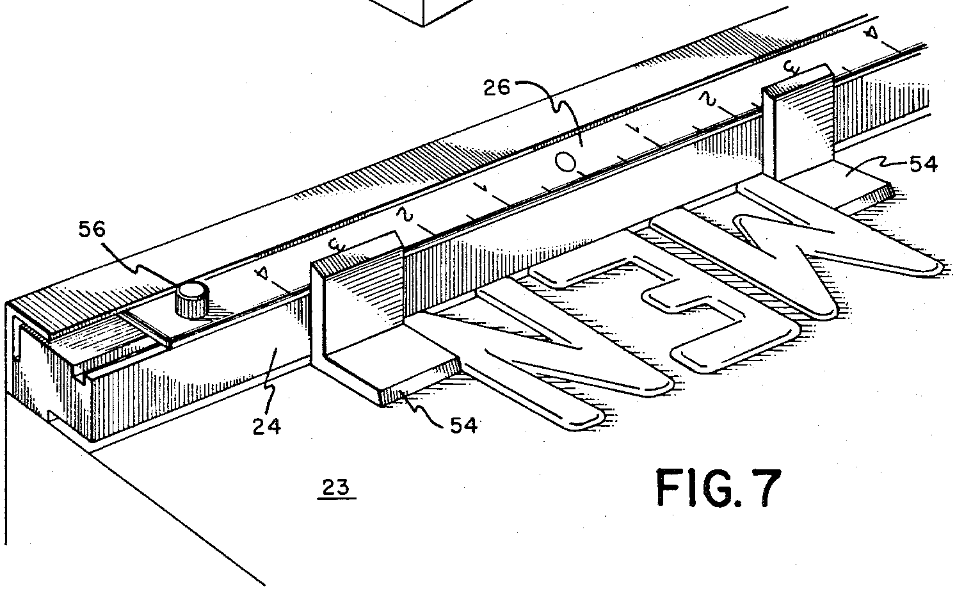
FIG. 7

FIG. 8
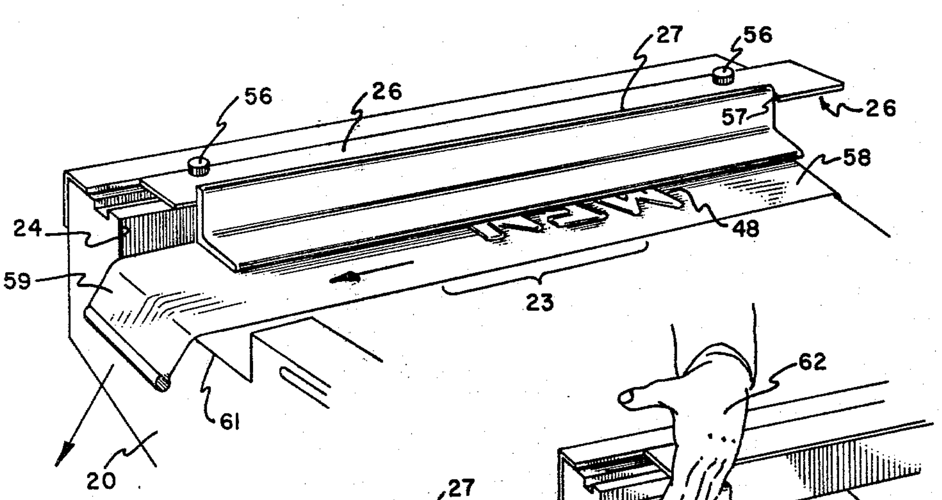
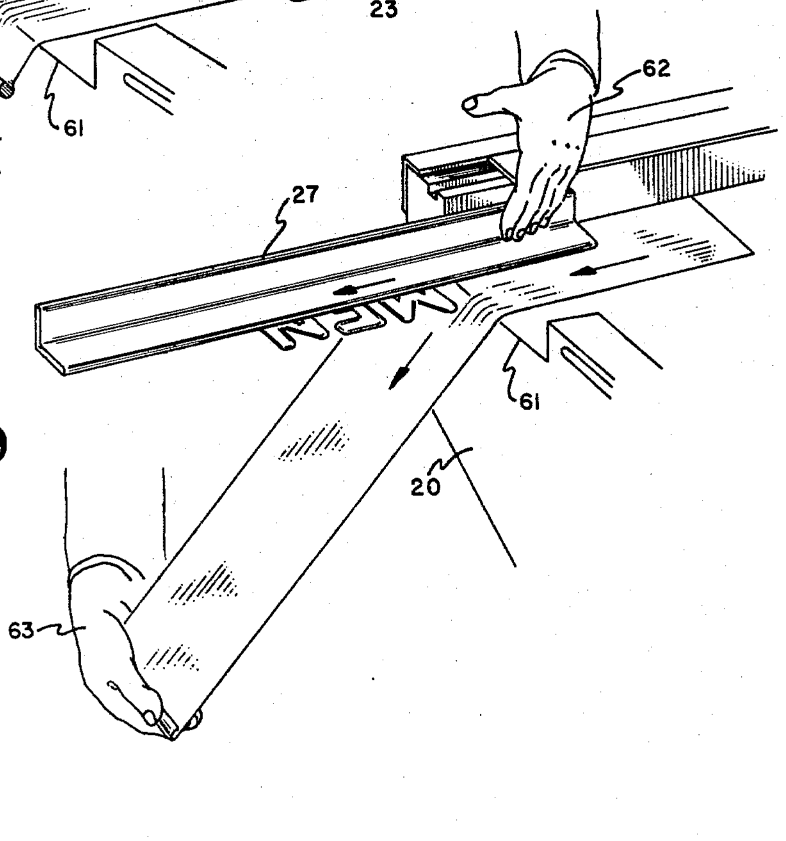
FIG. 9

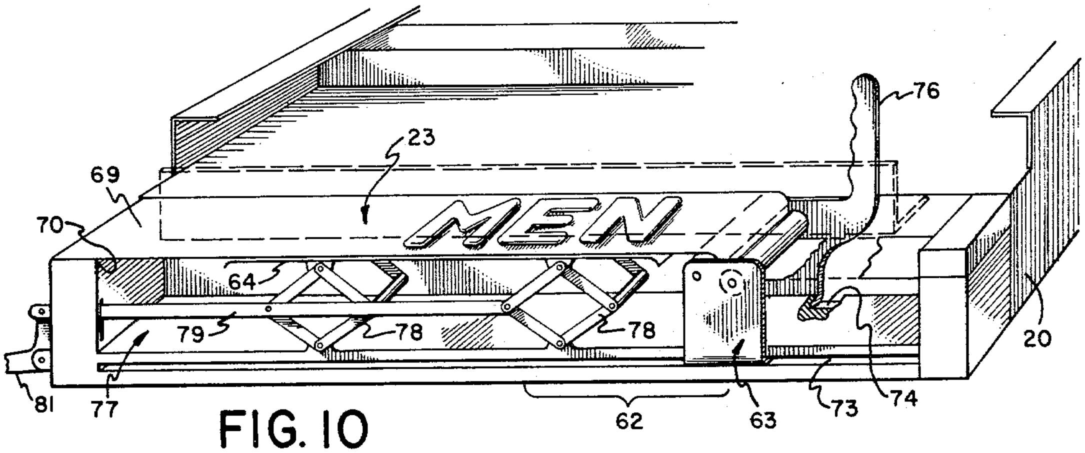
FIG. 10
FIG. 11
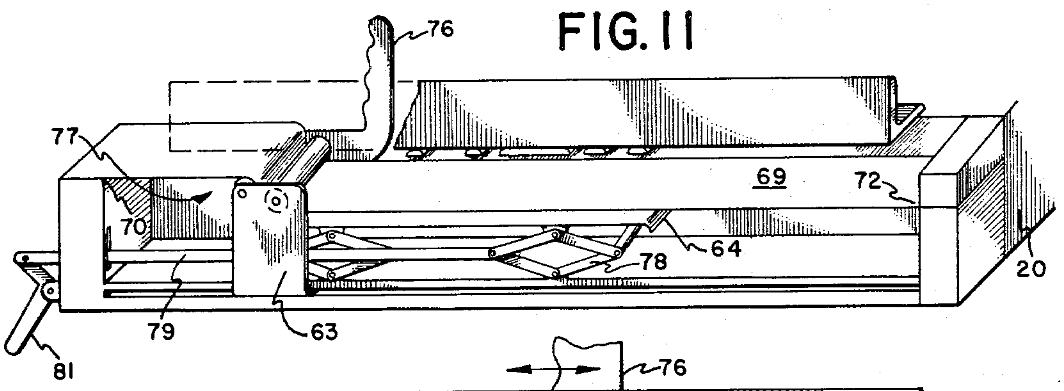
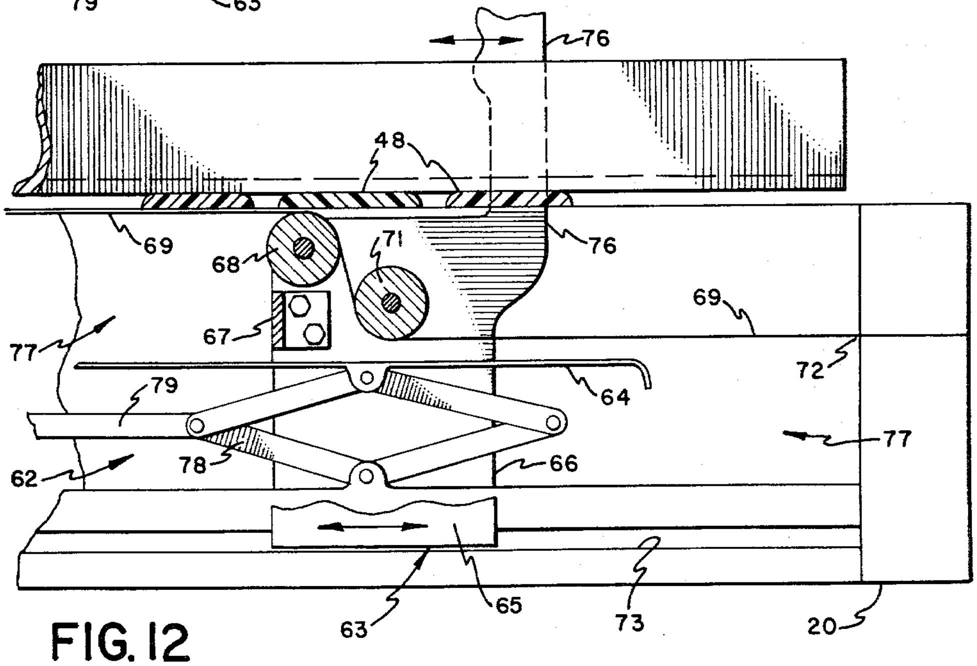
FIG. 12

FIG. 14
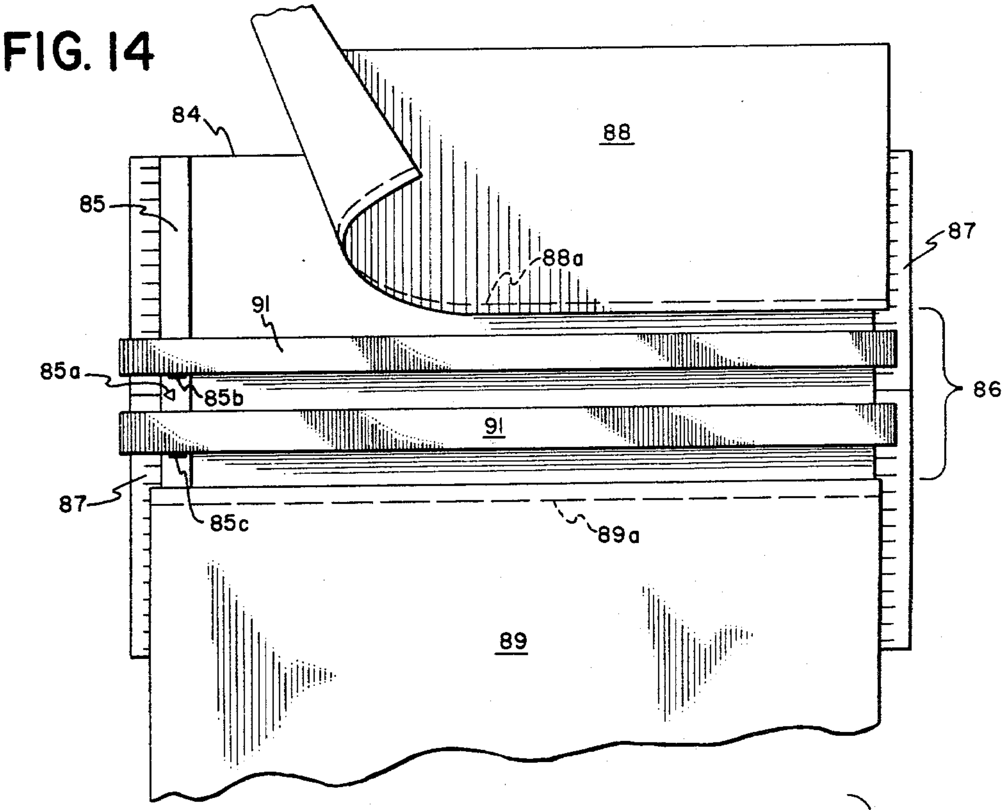
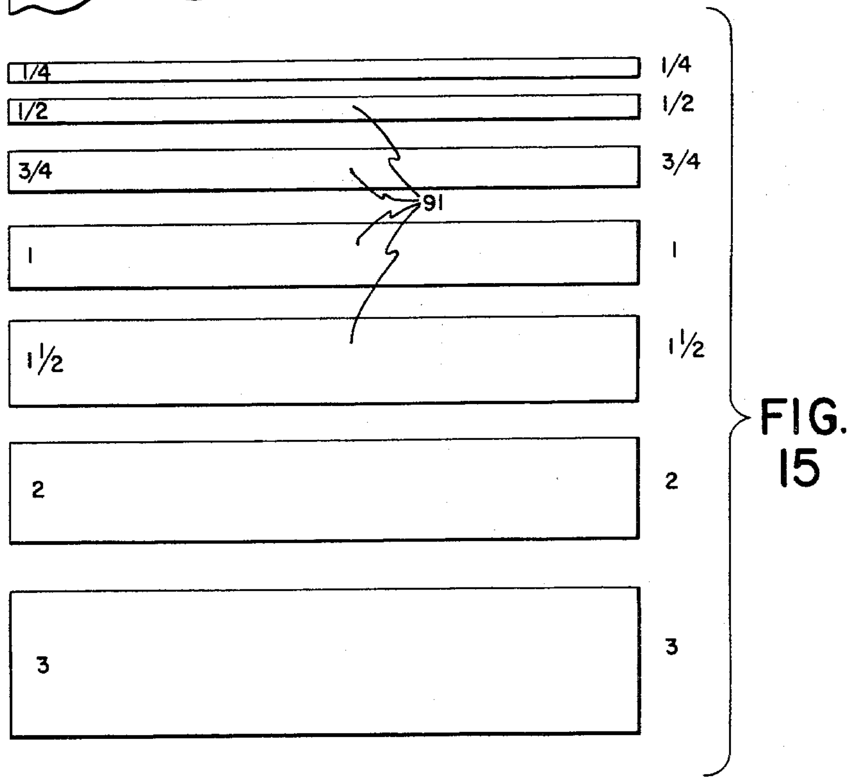
FIG. 15

METHOD AND APPARATUS FOR MAKING RAISED AND FLAT LETTER SIGNS

This is a division, of application Ser. No. 023,599 filed Mar. 26, 1979 U.S. Pat. No. 4,230,513.

TECHNICAL FIELD

This invention relates to signmakers' jigs and assembly tables, and more specifically to signmakers' worktables incorporating signblank positioning devices, a letter staging zone, and transfer devices for moving the staged letters as a group to the signblank, with cooperating centering and alignment guides to assure proper letter positioning.

BACKGROUND ART

Traditional techniques for making painted signs have required high levels of artistic craftsmanship to achieve pleasing layout, optimum letter spacing and proper letter formation, coupled with calligraphic mastery of many different upper and lower case alphabets.

The advent of molded plastic letters has reduced the need for expert calligraphy, but layout, transfer and positioning of the letters on the signblank to produce raised letter signs have still required painstaking artistry to achieve anything more than indifferent success.

The techniques and cooperating devices of this invention provide a convenient worktable for the signblank, a linespacing layout master for optimum line positioning, a letter staging zone where the individual molded or die cut letters can be manipulated, spaced and re-spaced for maximum readability, and transfer means for moving the entire line of letters en bloc for adhesive or solvent welding installation on the signblank.

Accordingly, a principal object of the present invention is to provide techniques and cooperating devices for layout and fabrication of molded, raised or die cut vinyl letter signs with speed and efficiency by signmakers having minimum artistic training and experience.

A further object of the invention is to provide signmaking techniques and devices of this character with a letter staging zone where individual letters are easily assembled, spaced, re-spaced and temporarily retained in their desired relationship without disturbance.

Another object of the invention is to provide signmaking techniques and devices of this character incorporating transfer means for moving each assembled line of letters bodily from the staging zone for adhesive or solvent welding installation on the signblank.

Still another object of the invention is to provide signmaking techniques and devices of this character incorporating positioning and centering guides for quick centering and positioning of assembled lines of letters.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings.

BRIEF DESCRIPTION OF DRAWINGS

FIG. 1 is a perspective view of a signmakers' worktable incorporating one embodiment the present invention;

FIG. 7 is a fragmentary enlarged rear perspective view of the staging zone with centering indicators temporarily in place;

FIGS. 8 and 9 are sequential fragmentary rear perspective views of the staging zone in a modified embodiment of the invention, showing a flexible staging release belt in successive operating positions;

FIGS. 10 and 11 are sequential fragmentary front perspective diagrammatic views of a further modified embodiment, showing a staging release belt actuating mechanism;

FIG. 12 is an enlarged front elevation diagram of the actuating mechanism of FIGS. 10 and 11;

FIG. 14 is a plan view of a layout board and associated components for making layout masters like that of FIG. 13;

FIG. 15 is a plan view of a plurality of layout strips employed with the board of FIG. 14;

BEST MODE FOR CARRYING OUT THE INVENTION

Figure 3:
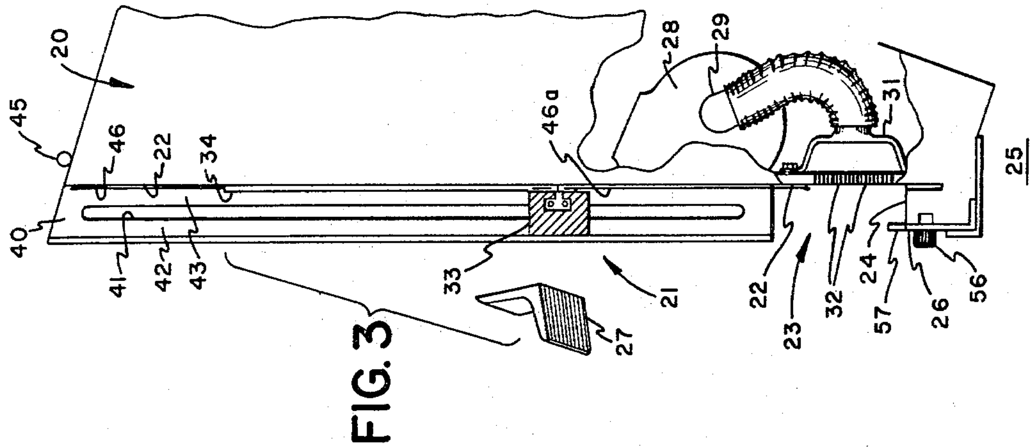
FIG. 3 is a cross-sectional side elevation view of the same sign assembly table, taken along the line 3—3 in FIG. 2.

The housing 20 surmounted by signmaking jig 21 shown in FIG. 1 incorporates a signblank-supporting worktable 22, a letter staging zone 23, a raised staging bar 24 surmounted by a slidable centering guide 26, positioned between the staging zone 23 and the operator's work station 25, and a manually movable transfer bar 27. The staging zone 23 is preferably provided with a non-skid, high friction traction surface. If desired, it may have a vacuum means such as a blower 28 (FIG. 3) beneath the worktable 22, actuated for example by a toggle switch 30 on the side of housing 20, whose intake 29 is connected by a vacuum manifold 31 and aperture slots or perforations 32 extending through the worktable 22, exposing objects placed on the staging zone 23 to underlying negative pressure. Ambient atmospheric pressure thus acts to force down and retain flat objects placed in the staging zone 23.

A setting bar 33 overlies the worktable 22 and is mounted at both sides thereof for freely reciprocating movement toward and away from workstation 25 through an infinite number of parallel positions, in the manner of a draftsman's T-square. Setting bar 33 is preferably spaced above worktable 22 by a few millimeters to pass directly over a signblank 34 of thin plastic sheet or other material secured for example by adhesive masking tape strips 36 to worktable 22.

Worktable 22 is preferably provided with a pattern or grid of transverse guide lines 37, including a central transverse base line 38 with numbered increments. For example, a worktable having an overall width of about 30 inches has a base line 24 inches long demarked in one-half inch increments marked with half-scale indicia; from left to right, 24", 23", 22" down to 0 at the center and back up to 24" at the right end. This permits a thin flat signblank 34 of any width up to 24 inches to be centered instantly on baseline 38, "vertically" positioned on table 22 relative to guide lines 37, and quickly held in place by masking tape strips 36. Alignment and centering may be easily re-checked visually and re-adjusted manually by the operator at any time during the signmaking process.

Setting bar 33 is provided at each end with such guide means as an end-wise protruding shaft or ledge 39 slidably fitting into a slot 41 (FIGS. 2, 3) formed between an upper guide rail 42 and a lower guide rail 43 spaced apart by spacers 40 by an amount slightly greater than the thickness of ledge 39, and extending along each side edge of worktable 22 from a point close to the front corner near the staging zone 23 at workstation 25 to the remote rear corner of worktable 22.

An adjustable clamping knob 44 is mounted via a threaded shaft in each end of the setting bar, and tightening rotation of knobs 44 provides clamping force against the outer faces of guide rails 42 and 43, anchoring the setting bar 33 in any adjusted position.

Figure 2:
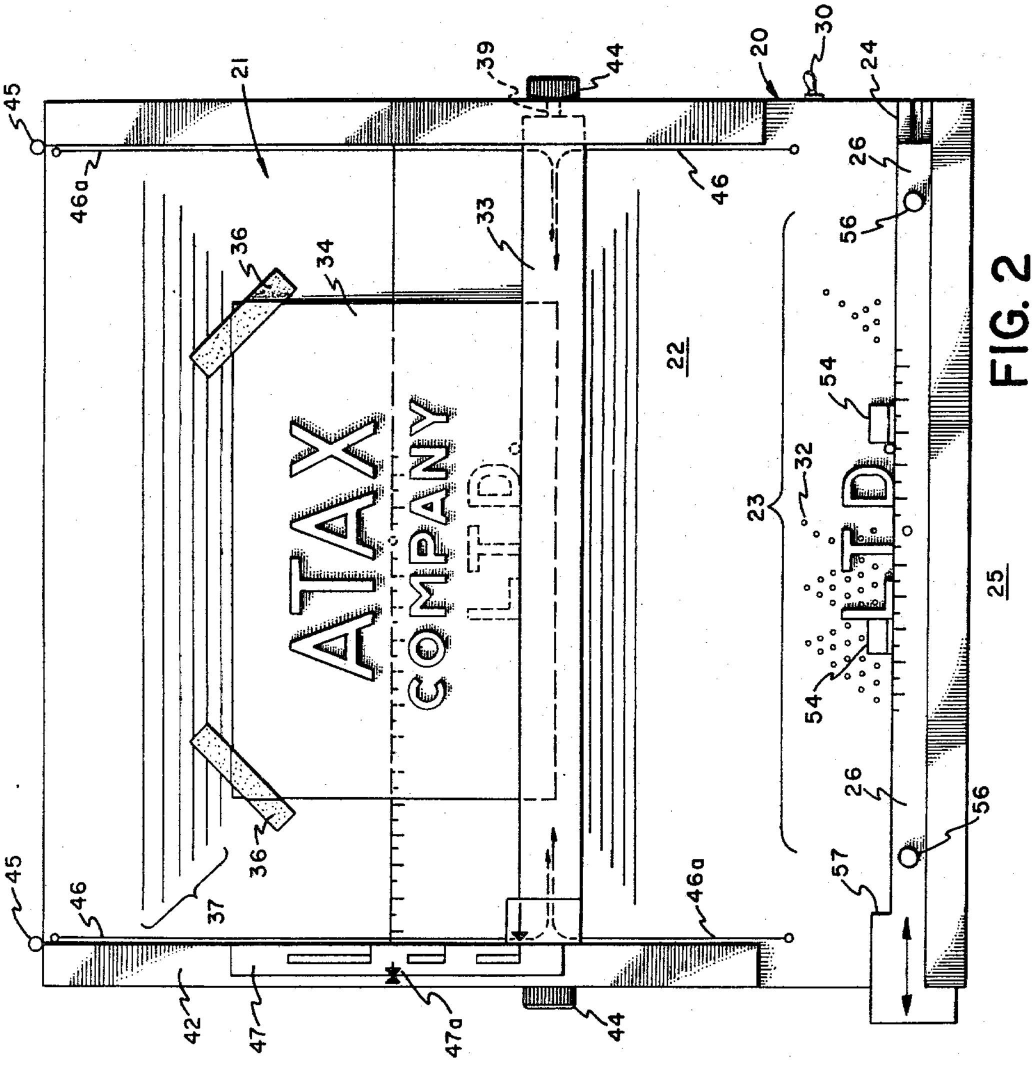
FIG. 2 is a top plan view of the sign assembly table of a modified embodiment, similar to the device of FIG. 1.

As indicated in FIG. 2, each end of setting bar 33 is anchored to a cable 46 stretched tightly over pulleys or guides on the underside of bar 33 in conventional drafting table fashion, assuring that "vertical" movement of one end of setting bar 33 away from workstation 25 will produce tracking "vertical" movement of the other end of setting bar 33 in the same direction. For example, the remote rear end of cable 46 is anchored by tightening means 45 such as a guitar string peg at the rear corner of housing 20, and extends forward along the left edge of worktable 22, around a first pulley on the left underside of setting bar 33, across table 22 under bar 33, around a second pulley on the right underside of bar 33, and forward along the right edge of table 22 to a fixed anchor point near staging zone 23, as shown in FIG. 1. A second cable **46*a* forms a mirror image of cable 46**.

To guide the signmaker in selecting each position for setting bar 33 corresponding to a line of staged letters, a layout master 47 carrying L-shaped line-level position indicia is preferably placed on worktable 22 on top of guide rail 42 at one end or each end of baseline 38, directly over the end of setting bar 33. Layout masters 47 are preferably imprinted on re-usable self-adhesive plastic strips, and may be made by the signmaker using the layout board shown in FIG. 14, or may be supplied in advance in standard sizes (e.g. two lines of one-inch letters on a six-inch signblank, etc.) by the supplier of the entire device. In the example shown in FIG. 2, layout master 47 for one line of 1 and $\frac{1}{2}$-inch letters and two lines of $\frac{3}{4}$-inch letters on a 5-inch high signblank is illustrated. A central arrowhead on guide rail 42 indicates the level of base line 38, at which layout master 47 should be set with its own central index arrowhead **47*a*** in registration. The upper line of 1 and $\frac{1}{2}$-inch letters is indicated by a bold vertical 1 and $\frac{1}{2}$-inch high bar, whose lower end is extended toward the signblank, indicating the level of the line of letters to be set.

To retain the assembled letters in their desired positions on staging zone 23, a layer of non-skid traction sheet material preferably covers the exposed surface of zone 23. Silicone-impregnated glass cloth has been found to provide a suitable nonskid surface.

Conventional molded plastic letters are securely retained in their adjusted positions in the staging zone 23 on such non-skid sheet material. When the line of letters is thus positioned, a centering indicator 54, preferably an L-shaped angle segment, is positioned at each end of the line of letters, projecting above staging bar 24 and centering guide 26, as shown in FIG. 7. A pair of centering screws with manual tightening knobs 56 are mounted at the ends of guide 26 cooperating with staging bar 24 to clamp guide 26 in position. By loosening screws 56, centering guide 26 is released to slide sideways on bar 24, and number-indicia on its exposed upper surface may be set to coincide with centering indicators 54. For example, if guide 26 carries positive and negative number indicia like those on baseline 38, guide 26 may be shifted sideways until matching numbers coincide with the centering indicators 54.

Guide 26 is provided with a rearwardly protruding step 57 at the left end of its indicia scale. Transfer bar 27 is indexed leftward against step 57 when it is used as described below to transfer the staged line of letters to the signblank. A similar step 55 is provided at the left end of setting bar 33, as shown in FIGS. 1 and 2.

When molded letters having rear faces coated with highly adherent adhesives are used, a peeling action may be needed to remove the staged letters 48 from the staging zone. For this purpose the modified embodiments of FIGS. 8 through 12 are useful.

FIGS. 8 and 9 show a flexible, removable strip 58 of non-skid high friction sheet material, slidably mounted on staging zone 23, and provided with a depending handle end 59 extending beyond housing 20. After letters 48 are staged in the staging zone 23, and transfer bar 27, indexed against step 57 on centering guide 26 is lowered on letters 48 to bring its adhesive bottom coating 52 into engagement with the exposed surface of letters 48, the transfer bar and letters are released from staging zone 23 as shown in FIGS. 8 and 9. Gentle downward force exerted by the operator on the depending end 59 of flexible strip 58 opposite step 57 on guide 26 causes the entire strip 58 to move sidewise across staging zone 23, carrying with it the staged letters 48 and transfer bar 27 adhered to them. As bar 27 and letters 48 reach the end of staging zone 23, they pass over the edge 61 of housing 20. The operator holds the trailing end of transfer bar 27 down on staging zone 23 with his left hand 62 while continuing to exert downward force on handle end 59 of strip 58 with his right hand 63. As strip 58 passes over edge 61 of housing 20, it peels downward away from letters 48. This leaves letters 48 firmly adhered in staged position on the adhesive bottom coating 52 on the underside of transfer bar 27, as shown in FIG. 9, ready to be moved into juxtaposition with setting bar 33 for delivery to signblank 34. Also, when setting lines of thin sheet vinyl letters in lower case, provision for the lower stroke of the letters such as "p", "g", "y", etc. has been made by leaving clearance beneath the staging bar 24. In order to transfer all upper and lower case letters effectively, the process demonstrated in FIGS. 8–9 is required.

When molded or raised lower case letters are used, lower-stroke letters are simply inverted for staging and transfer on transfer bar 27 to signblank 34, where they are then picked up and repositioned upright by the signmaker before being permanently adhered to the signblank.

The same peeling mode of release of letters 48 is also employed in the transversely slidable truck mechanism shown in FIGS. 10–12. In the modified embodiment shown in these FIGURES, the forward work station edge of the housing 20, nearest to work station 25, is provided with a staging belt stripping mechanism 62 (FIG. 10). This mechanism incorporates two subassemblies, the slidable truck 63 and a downwardly retractable table assembly 64.

Truck 63 is formed by upstanding front frame 65 and rear frame 66, joined rigidly by a rearwardly extending strut 67 having flanged ends riveted to the two frames. As viewed in FIG. 10, an upper roller 68 is rotatably mounted between frames 65 and 66, extending rearwardly directly under a belt of non-skid fabric 69 underlying staging zone 23. Belt 69 extends from a left anchoring point 70 at the left front corner of housing 20, to the right and downward under a lower roller 74, also rotatably mounted between frames 65 and 66, and thence to a lower right anchoring point 72 at the right front corner of housing 20.

The lower ends of frames 65 and 66 are provided with inturned flanges slidably positioned in corresponding front and rear guide grooves. Front guide groove 73 extends across the front lower edge of housing 20, as shown in FIGS. 10–12, and rear guide groove 74 similarly engages the lower flanged end of rear frame 66, as shown by the cutaway lower right portion of FIG. 10.

An integral stripping handle 76 extends upwardly from rear frame 66, to produce sidewise sliding movement of truck 63 in a transverse track chamber 68 directly under belt 69.

The belt-supporting table 64 is mounted directly under belt 69 in the track chamber 77 extending across the workplace front portion of housing 20. Table 64 is mounted on two lazy tongs-type linkages 78, permitting table 64 to move up and down from a support position forced up against the underside of belt 69 at staging zone 23, as shown in FIG. 10, to a retracted lower stripping position shown in FIG. 12, below the level of rollers 68 and 71 on track 63. As indicated in FIGS. 10 and 11, a bar 79 pivoted to linkages 78 extending through the left wall of housing 20 is pivoted to a bell crank 81, resiliently toggled toward either the support position of FIG. 10 or toward the retracted position of FIGS. 11 and 12.

Downward actuating movement of bell crank 81 toward its retracting position shown in FIG. 11 draws table 64 downward below rollers 68 and 71. Leftward force on handle 76 urges truck 63 leftward past retracted table 64, as shown in FIGS. 11 and 12. Progressive leftward movement of truck 63 peels belt 69 downward away from the underside of letters 48 (FIG. 12) around upper roller 68 and under lower roller 71. Belt 69 is installed taut between its anchoring points around rollers 68 and 71, facilitating its stripping peeling removal from letters 48 by actuation of truck 63 past lowered table 64.

After stripping, letters 48 remain supported only by the adhesive coating 52 on the underside of overlying manual transfer bar 27, as shown in FIG. 11, ready for movement to signblank 34.

Figure 13:
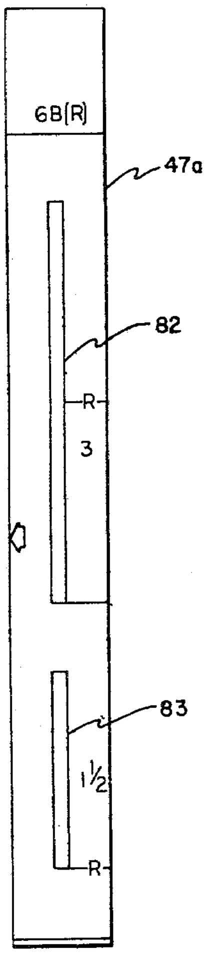
FIG. 13 is an enlarged plan view of a flexible adhesive-backed layout master strip employed with the worktable of FIG. 1.

A typical layout master 47*a* for a six-inch high signblank is shown in FIG. 13, similar to the layout master 47 shown installed on the jig assembly 21 in FIG. 1, atop the left upper guide rail 42. As shown in FIG. 13, the layout master 47*a* directs the signmaker's positioning of a line of 3" letters above a line of 2" letters on a six-inch signblank. Alternatively, a reciprocal layout is also shown by the lines marked "R" on master 47*a*: the upper "R" line is 2" from the top of the upper line indicium 82, while the lower "R" line corresponds with the lower end of the lower line indicium 83; setting bar 33 may be successively aligned with these two "R" lines to position a 2" line above a 3" line of letters, the "reciprocal" of the layout for which master 47*a* is primarily designed.

A layout board 84 for the signmaker's use in preparing custom made layout masters is shown in FIG. 14, incorporating an underlying layout panel 86 carrying raised ruled index guides 87 along both of its side edges. Guides 87 are preferably ruled in ½" increments increasing from a center "O" mark up to 16" or 18" at top and bottom ends; the first half-inch increment is marked 1"; the second is marked 2", etc.

A layout master blank 85 of adhesive-backed flexible sheet material is placed along the left guide 87. Blank 85 is provided with a central index arrow 85*a* which is aligned with the "O" center mark on guide 87, as shown in FIG. 14.

A pair of opaque vinyl sheet "curtains" 88 and 89 are each provided with a flexible magnetized strip 88*a* and 88*b* along one edge. Lower magnetized edge 88*a* of upper curtain 88 is positioned across steel panel 86 at the upper 8" index mark on guides 87, and upper magnetized edge 89*a* of lower curtain 89 is positioned across steel panel 86 at the lower 8" index mark on guides 87. Curtains 88 and 89 thus cover all but the central 8-inch high portion 90 of panel 86 exposed between the upper and lower 8" marks on guides 87, corresponding to an eight-inch high signblank 34.

A selection of flexible magnetic layout strips of varying widths, preferably of magnetized sheet plastic material, is provided for use with layout board 84, as shown in FIG. 15. Each layout strip represents a line of letters of corresponding height, and their lengths are greater than the width of panel 86. The signmaker selects a strip 91 corresponding to each line of letters, and positions these magnetized strips on the exposed portion 90 of panel 86, adjusting them manually until he is satisfied with their appearance. Being longer than the width of panel 86, strips 91 overlap layout master blank 85, as shown in FIG. 14. He then scribes index marks 85*b* and 85*c* across blank 85 with pen or pencil, along the lower edges of overlapping layout strips 91, indicating the lower edges of each line of letters to be set on the signblank, and the new layout master 85 is then ready to be transferred for use to the top surface of the left upper guide rail 42, as shown in FIGS. 1 and 2.

Figure 17:
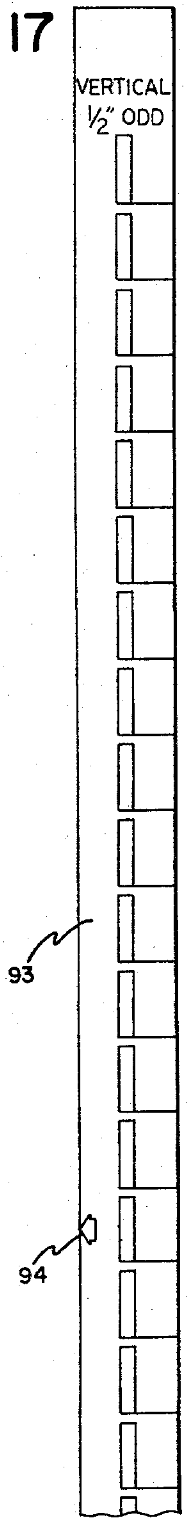
FIG. 17 is a fragmentary enlarged plan view of a modified version of the layout master shown in FIG. 16.
Figure 16:
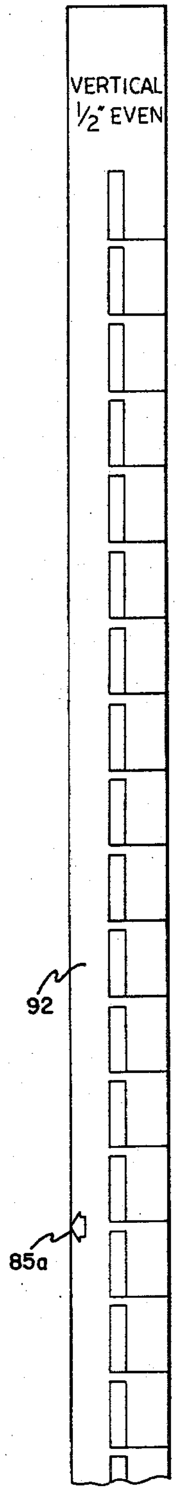
FIG. 16 is an enlarged plan view of a different layout master strip employed for vertically arranged columns of letters.

For use in laying out vertical columns of letters, a vertically-oriented layout master 92 may be pre-printed or laid out as just described, with its central index arrow 85*a* between letter marks to position an even number of letters vertically, as indicated in FIG. 16. For an odd number of vertical letters, a similar vertical master 93 with its central index arrow 94 beside the midpoint of a letter mark may be provided, as shown in FIG. 17.

U.S. Pat. Nos. 2,447,011, 3,461,583 and 3,541,712 show particular forms of letter-holding transfer frames, and U.S. Pat. Nos. 2,775,048 and 3,453,761 show adhesive retention of individual letters, but none of these prior patents discloses or suggests the techniques or devices of this invention.

OPERATION

The signblank 34 of thin flat sheet cast acrylic material is selected or cut to size, and is positioned on worktable 22 with its center directly over the center of base line 38, and its upper and lower edges level with guide lines 37. Masking tape strips 36 secure the signblank 34 firmly in position.

Layout master 47 carrying line level position indicia for the sign desired is secured at the left end of baseline 38, preferably atop guide rail 42.

The letters required, normally formed of molded plastic or die-cut vinyl material, are selected from a nearby storage tray, and in the vacuum-staging embodiment, blower switch 30 is turned on to activate blower 28, creating letter-holding negative pressure at staging zone 23.

Figure 4:
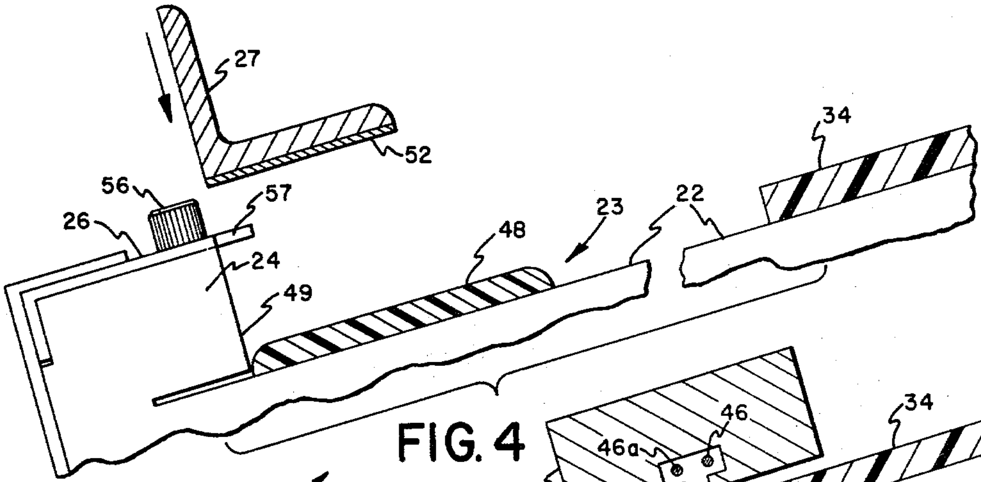
FIGS. 4, 5 and 6 are corresponding fragmentary cross-sectional side elevation diagrams of a sign assembly table of the invention, showing successive steps in the fabrication of a molded-letter sign thereon.

The line of letters 48 to be set in zone 23 is arranged and manipulated for optimum readability and most appropriate spacing, while being retained in place in zone 23 by the negative pressure created by blower 28. The lower edges of the letters 48 are juxtaposed to the rear face 49 of setting bar 24, as shown in FIG. 4.

When the signmaker is satisfied with the arrangement of letters 48, he slides setting bar 33 rearwardly over signblank 34 until its rear edge is in registration with the extended lower end of the desired bold-face bar on layout master 47 for the line being mounted, and clamping knobs 44 are tightened.

The slidable centering guide 26 is next moved laterally on setting bar 24 until its "O" center position denotes the center of letters 48. Preferably guide 26 is marked in increasing increments from 0 to 12 proceeding both left and right from its O-center. This facilitates centering the slidable guide to match the scale readings for each end of the line of letters 48, using centering indicators 54 if desired. The front face 51 of transfer bar 27 is then carefully lowered into downward sliding juxtaposition with the rear face 49 of the staging bar 24, as indicated in FIG. 4.

Figure 5:
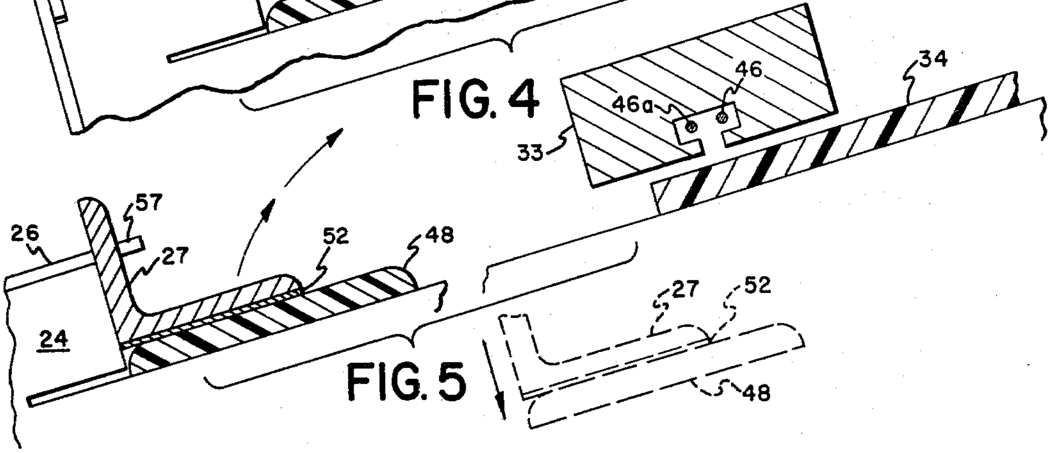

The bottom face of transfer bar 27 is provided with adhesive material 52 sufficiently sticky to grip and support the letters 48. As transfer bar 27 is slowly lowered along rear face 49 of staging bar 24, with the left end of transfer bar 27 retained in contact with rearwardly protruding step 57 on centering guide 26 (FIGS. 1 and 8), until the adhesive bottom surface 52 of bar 27 is brought into contact with the top surfaces of the letters 48, as shown in FIG. 5. Blower switch 30 may be turned off, and the transfer bar 27 carrying the full line of letters 48 is lifted from staging zone 23 and carefully transported rearwardly to a position above setting bar 33, as shown in dashed lines in FIG. 6.

Transfer bar 27 is then slowly lowered, with its front face 51 in sliding contact with the rear face 53 of setting bar 33, and with the left end of transfer bar 27 retained in contact with rearwardly protruding step 55 on setting bar 33 (FIGS. 1 and 2), until letters 48 rest on the face of signblank 34.

Lateral or sidewise positioning of the line of letters 48 is assured by several cooperating features of the device, the step 57 on slidable centering guide 26 cooperating with transfer bar 27, aligned when the letters 48 are picked up on bar 27, and the step 55 on setting bar 33, similarly aligned as bar 27 is lowered to place letters 48 on signboard 34.

The molded plastic letters 48 now resting on signblank 34 can be bonded firmly in position by adding a drop of solvent solution, acetone for example, to the upper edge of each letter where it rests on the signblank 34. The solvent seeps quickly between each letter and the signblank by capillary attraction, dissolving and bonding their facing surfaces in a firmly anchored relationship.

Figure 6:
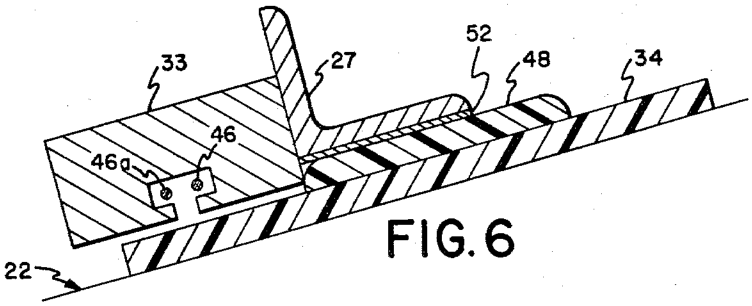

After bonding is completed, the adhesive transfer bar may be rotated rearwardly, clockwise in FIG. 6, to release its adhesive bottom face from letters 48.

The foregoing steps may then be repeated for additional lines of letters.

Pressure sensitive adhesive letters with self-adhesive backs, normally require stripping using the flexible removable strip 58 of high friction material shown in FIGS. 8 and 9, or operation of the belt-stripping mechanism shown in FIGS. 10–12. This releases letters 48, adhering on the underside of transfer bar 27, producing the same stripping action as the manual technique described with reference to FIGS. 1–7.

In addition to fabrication of permanent signs, the techniques and devices of this invention are useful in performing intermediate steps in the production of other graphic displays. Under-masters for making hand-cut silk screen stencils are easily made by setting thin flat adhesive-backed die-cut sheet vinyl letters on a thin flexible signblank of white paper or Bristol board. Film positives or transparencies for making photographic silk screen stencils or for other uses in photographic printing and lithography are easily made by adhesively bonding such sheet vinyl letters to a clear acetate or transparent mylar-type film. Molded or raised letters adhesively bonded to a perforated substrate form a master for convenient use in fabricating thermal vacuum-formed signs of heat-softened sheet plastic material, such as the removable temporary vehicle signs magnetically mounted on the doors of automobiles and trucks.

Artistic taste and manual dexterity are both useful to the signmaker in utilizing the devices of this invention, but once positioned, the aligned and staged letters are conveniently retained undisturbed. Re-adjustment and repeated realignments of letters are thus all avoided with the convenient and efficient techniques and devices of this invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A layout table for making signmakers' line level indicating layout master guide strips comprising a paramagnetic layout panel having height and width at least equal to those of a signblank to be laid out, a blank layout master strip of sheet material positionable along one side of the layout panel, an upper curtain sheet having a magnetized strip along its lower edge positionable across the upper portion of the layout panel to denote the upper edge of a signblank, a lower curtain sheet having a magnetized strip along its upper edge positionable across the lower portion of the layout panel to denote the lower edge of a signblank, leaving a central transverse portion of the blank layout master strip and the layout panel exposed between the curtains representing the signblank, and a selectable plurality of magnetized layout strips of different widths corresponding to heights of letters to be employed by the signmaker, each individually positionable extending across the exposed panel portion and the blank layout master and independently manually adjustable to positions representing individual lines of sign letters whereby the signmaker may shift and readjust the magnetized layout strips on the paramagnetic panel to produce a visually pleasing line layout, and then inscribe the blank layout master with line level indicia, thereby completing the layout master for juxtaposition with a signblank for indicating the level of lines of letters to be mounted thereon.

* * * * *